US012475757B2

(12) United States Patent
Wieth et al.

(10) Patent No.: US 12,475,757 B2
(45) Date of Patent: Nov. 18, 2025

(54) DEPOSIT LOCK SYSTEM AND METHOD FOR OPERATING A DEPOSIT LOCK SYSTEM FOR A LOAN OBJECT

(71) Applicants: Franz Wieth, Puchheim (DE); Andreas Filosi, Puchheim (DE)

(72) Inventors: Franz Wieth, Puchheim (DE); Andreas Filosi, Puchheim (DE)

( * ) Notice: Subject to any disclaimer, the term of this patent is extended or adjusted under 35 U.S.C. 154(b) by 593 days.

(21) Appl. No.: 17/909,492

(22) PCT Filed: Mar. 8, 2021

(86) PCT No.: PCT/EP2021/055820
§ 371 (c)(1),
(2) Date: Sep. 6, 2022

(87) PCT Pub. No.: WO2021/176105
PCT Pub. Date: Sep. 10, 2021

(65) Prior Publication Data
US 2023/0123206 A1 Apr. 20, 2023

(30) Foreign Application Priority Data
Mar. 6, 2020 (DE) ..................... 10 2020 106 211.7

(51) Int. Cl.
*G07F 17/00* (2006.01)
*E05B 47/00* (2006.01)
*E05B 63/00* (2006.01)
*E05B 73/00* (2006.01)
*G06Q 20/32* (2012.01)
(Continued)

(52) U.S. Cl.
CPC ...... *G07F 17/0057* (2013.01); *E05B 47/0012* (2013.01); *E05B 63/003* (2013.01); *E05B 73/00* (2013.01); *G06Q 20/3278* (2013.01); *G07F 7/0654* (2013.01); *G07F 7/0663* (2013.01); *G07F 7/0681* (2013.01); *G07F 17/10* (2013.01); *E05B 2047/0016* (2013.01); *E05B 2047/0017* (2013.01); *E05B 2047/0069* (2013.01); *E05B 2047/0095* (2013.01); *G07C 9/00182* (2013.01)

(58) Field of Classification Search
CPC .... E05B 47/0012; E05B 63/003; E05B 73/00; E05B 2047/0016; E05B 2047/0017; E05B 2047/0069; E05B 2047/0095; G06Q 20/3278; G07F 7/0654; G07F 7/0663; G07F 7/0681; G07F 17/10; G07C 9/00182
USPC ..................................... 70/DIG. 41; 194/905
See application file for complete search history.

(56) References Cited

U.S. PATENT DOCUMENTS 5,701,988 A * 12/1997 Tsukada .................. G07F 17/12
70/DIG. 41
7,552,809 B2 * 6/2009 Lu ......................... E05B 63/143
194/247
2021/0287280 A1 9/2021 Wieth et al.

FOREIGN PATENT DOCUMENTS

CN 202324872 U 7/2012
CN 105464482 A 4/2016
(Continued)

*Primary Examiner* — Jeffrey A Shapiro
(74) *Attorney, Agent, or Firm* — Laurence A. Greenberg; Werner H. Stemer; Ralph E. Locher

(57) ABSTRACT

A method for operating a deposit-operated lock system for a borrowed object, in particular for a transport trolley which can be moved by hand. There is also described a suitable deposit-operated lock system. A key that is held in a deposit lock is released when an electric drive drives a carriage that is displaceably mounted on a blocking element in an initial position.

17 Claims, 1 Drawing Sheet

Figure 1:
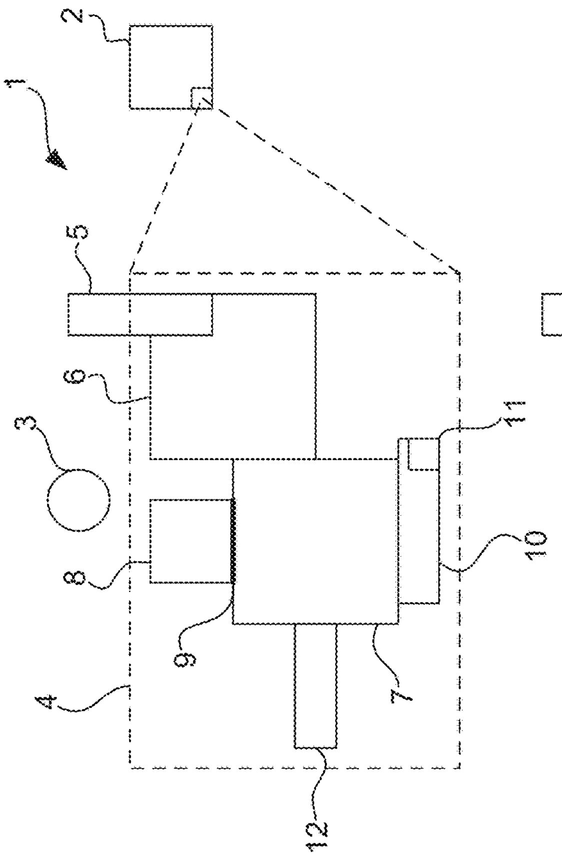
Figure 2:
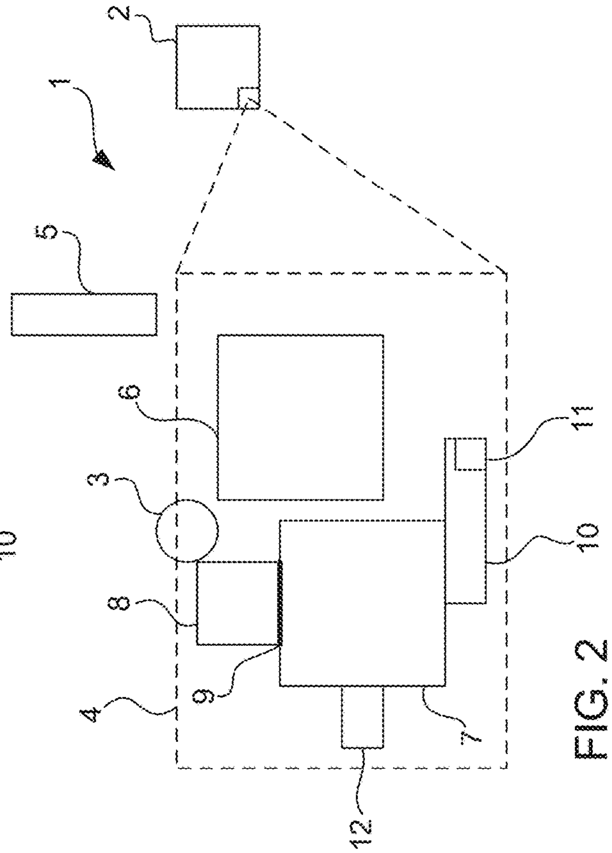
Figure 3:
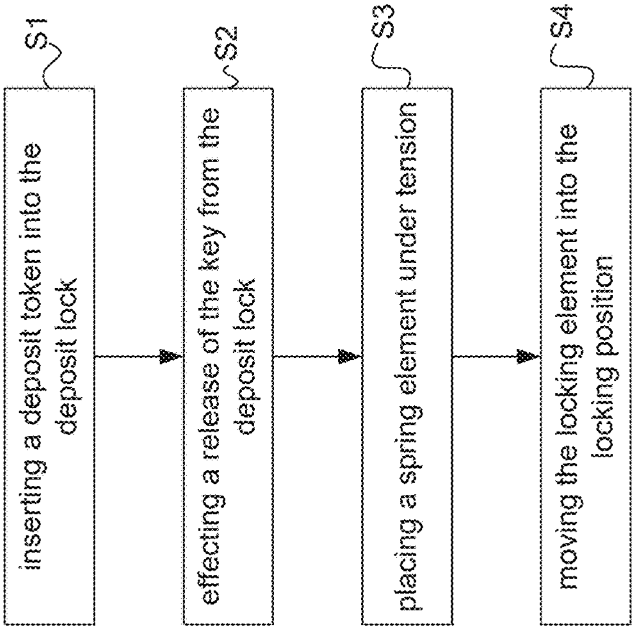

(51) Int. Cl.

| | |
|---|---|
| ***G07F 7/06*** | (2006.01) |
| ***G07F 17/10*** | (2006.01) |
| *G07C 9/00* | (2020.01) |

(56) References Cited

FOREIGN PATENT DOCUMENTS

| | | | |
|---|---|---|---|
| CN | 108824997 | A | 11/2018 |
| DE | 202018003172 | U1 | 8/2018 |
| DE | 102018108116 | A1 | 10/2019 |
| EP | 1035523 | B1 | 1/2007 |
| EP | 3491602 | A1 | 6/2019 |

* cited by examiner

DEPOSIT LOCK SYSTEM AND METHOD FOR OPERATING A DEPOSIT LOCK SYSTEM FOR A LOAN OBJECT

FIELD AND BACKGROUND OF THE INVENTION

The invention relates to a method for operating a deposit lock system for a loan object, in particular for a manually movable transport trolley, wherein a blocking element of the deposit lock secures the key in the deposit lock against removal in a holding position and releases the key in a release position, wherein a locking element blocks a displacement of the blocking element from its holding position into its release position in a locking position and releases displacement of the blocking element into its release position in an unlocking position, wherein an actuator is moved from a first position to a second position by the input of a deposit token into the deposit lock, wherein the actuator, upon movement from the first to the second position, displaces the locking element from its locking position to its unlocking position, wherein a return of the locking element to its locking position and of the actuator to its first position is blocked by the blocking element when it is in the release position.

Furthermore, the invention relates to a deposit lock system for a loan object, in particular for carrying out a method according to the invention, comprising a deposit token, a deposit lock and a key, wherein the key held in the deposit lock is released by insertion of the deposit token into the deposit lock, wherein a blocking element is adjustably mounted in the deposit lock so that it is adjustable between a holding position, in which it secures the key in the deposit lock against removal, and a release position, in which it releases the key, wherein a locking element is adjustable between a locking position, in which it holds the blocking element in its holding position and an unlocking position in which it releases the blocking element, the deposit lock having at least one actuator which can be moved from a first position to a second position by insertion of the deposit token into the deposit lock, wherein the actuator has a contact surface for the locking element, so that a movement of the actuator from its first to its second position displaces the locking element from its locking position to its unlocking position, wherein the blocking element located in the release position blocks the path of the locking element to its locking position and the path of the actuator to its first position.

Deposit lock systems have been used for some time, for example in the wholesale and retail trade. They are used there to collect shopping carts in a shopping cart garage and to lock them together by means of the deposit lock system. The well-known deposit locks are operated manually and function purely mechanically. A key held in the deposit lock is released by inserting a deposit coin or deposit token into the deposit lock. This secures the coin in the deposit lock against removal. Inserting a suitable key into the deposit lock releases the deposit coin again, whereby the key is again locked in the deposit lock. Such a deposit lock is shown by EP 1 035 523 A2.

SUMMARY OF THE INVENTION

The object of the present invention is to propose a method and a deposit lock system in which the deposit lock can not only be operated by hand, but can also be triggered electrically or electronically.

This object is solved by a method as claimed and a deposit lock system as claimed. Some preferred embodiments of the method or the system are covered by the dependent claims.

A basic idea of the invention is that the release of the key held in the deposit lock also takes place when an electric drive moves a carriage which is in an initial position displaceably mounted on the locking element, wherein in a first movement step of the carriage the carriage displaces the locking element from its locking position to its unlocking position and in a second movement step of the carriage the carriage is moved again to its initial position, wherein during the first and/or second movement step a spring element arranged between the carriage and the locking element is placed under tension, and that the locking element is moved into its locking position by relaxing the spring element as soon as the blocking element releases the return of the locking element into its locking position. The deposit lock system according to the invention is characterized in that an electric drive is connected to a carriage which is movably mounted on the locking element, wherein a spring element is arranged on the locking element which is under tension when the blocking element blocks the path of the locking element back into the locking position.

The slide displaceably mounted on the locking element enables the locking element to be moved by means of an electric drive independently of the movement induced purely mechanically by inserting a deposit token. In the first movement step, the carriage, which is held displaceably on the locking element, drives the locking element and thus moves it from its locking position to the unlocking position. During the first movement step, a spring element resting between the locking element and a stop arranged stationary to the electric drive is tensioned. In the second movement step, the carriage acts on the locking element via the spring element in a alternative or supplementary second embodiment. When the blocking element is in the release position and blocks the return path of the locking element to its locking position, the carriage moves relative to the locked locking element during its path back to the initial position. In the second embodiment this causes the spring element arranged between the carriage and the locking element to be placed under tension. If the blocking element releases the path of the locking element, the locking element is moved back to its locking position in the first embodiment by the spring force acting between the locking element and the stop and in the second embodiment by the spring force acting between the locking element and the carriage, whereby the spring element relaxes. It is of particular advantage here if the spring element is preloaded in the locking position of the locking element, so that when the locking element moves into the unlocking position, a spring force sufficient for the spring-induced return of the locking element into the locking position can be built up.

If the key is released by inserting a deposit token into the deposit lock, the movement of the actuator from its first to its second position also results in a displacement of the locking element from its locking position to its unlocking position. The carriage, which is held displaceably on the locking element remains at least substantially in its initial position. In the first embodiment, this places the spring element arranged between the locking element and the stop under tension, and in the second embodiment, it places the spring element arranged between the locking element and the carriage under tension. In accordance with the above, the spring force causes the locking element to return to the locking position as soon as the blocking element clears the way again.

The carriage, which is held displaceably on the locking element, can thus move independently of the position of the locking element. Likewise, the locking element can move independently of the position of the carriage. This enables a deposit lock system in which the key can be released from the deposit lock both by insertion of a deposit token and by activation of an electric drive.

For the mode of operation and the features of the deposit lock system operated by a deposit token, reference is made to EP 1 035 523 B1 (hereinafter referred to as EP 1), the features and method steps of which are adopted by this application with one exception and which form part of this application. This exception concerns the interaction between the actuator according to the invention, which is also referred to in the EP as an actuator, and the blocking element according to this invention, which is referred to in the EP 1 as an intermediate element, in particular as a rotary part. According to the invention, the blocking element is not actuated or released directly but only indirectly by the actuator. The actuator acts on the locking element and adjusts it.

Advantageously, the electric actuator is controlled by a sensor that detects a wirelessly transmitted signal that triggers the movement of the electric drive. Such a sensor can, for example, be an NFC sensor that detects a signal sent via NFC from a mobile telecommunications terminal, for example a smartphone, and triggers the electric drive in response. Possible alternatives and/or additions to this can be found in EP 3491 602 A1 (EP 2).

It is of particular advantage if an electronic control element of the deposit lock, for example a circuit board or a microcontroller (MCU), is in principle in standby mode and communication between NFC or the circuit board or the MCU does not start until the mobile telecommunications terminal is placed on the device. Subsequently, the electronic control element goes back into standby. So it is temporarily woken up by establishing the communication between passive NFC tag and the active NFC of the mobile telecommunication terminal. Trough this, a low power consumption and thus a long lifetime can be achieved.

The electrical drive of the carriage can be electromagnetic, i.e. by adjusting the carriage by means of an electromagnetic field. Of particular advantage is the design of the electric drive as an electric motor, which can be easily integrated into the deposit lock system. Particularly advantageous is a design in which the electric motor is a rotary motor and an eccentric is arranged between the electric motor and the carriage, so that a rotary movement of the electric motor is converted into a linear movement of the carriage. This makes it possible to represent the movement of the carriage by means of a 360 degree motor rotation, where the first movement step is along the first 180 degrees of motor rotation and the second movement step is back to the initial position of the carriage along the second 180 degrees. In an alternative embodiment to this, the motor rotation during the first movement step is less than 180 degrees, in particular between 30 and 150 degrees, preferably 110 degrees. This makes it possible to form a stop for the carriage against which it comes to rest at the end of the first movement step. By means of the stop, it is easier to detect when this position is reached. If the carriage moves against the stop, further movement of the motor, which is still running, is blocked; the increased power consumption of the motor resulting from this can be measured as a signal that the stop has been reached.

In an alternative embodiment to this, the electric motor is a linear motor, whereby the conversion of the rotational movement can be omitted. Even in the case of a linear motor, the position determination described above for the rotary motor can be used at the end of the first movement step by means of a stop.

If one or more sensors detect that the initial position of the carriage and/or the unlock position of the locking element has been reached, this enables precise actuation and/or control of the electric drive. A sensor that is particularly suitable for this purpose is a Hall sensor, which detects the presence of a magnet connected to the carriage or the locking element. Accordingly, a Hall sensor can also be used to detect the presence of a key in the deposit lock. Another possible use for a sensor, in particular a Hall sensor, is to detect whether the locking element is located in the locking position. The detection of a particular position can be used to detect unwanted or mismatched positions of the respective movable elements. In such a case, a corresponding error message can be submitted.

In a particularly suitable embodiment, the locking element is a pin. A spring element in the form of a coil spring can be placed and held on this.

A further basic idea of this application, which in particular adopts the teaching known from EP 3 491 602 A1 (EP 2), supplements it or shows alternatives thereto, relates to the function or operation of an electronic deposit lock. The following can be used for the deposit lock system explained above as well as for the method of operating the same. However, a reference thereto is not necessary, and the following can thus also be considered independently of the deposit lock system described above. In this respect, what follows is not bound by what has been said above.

The functions of the electronic deposit lock are described starting from two loan objects chained together by means of the deposit lock system, for example a row of shopping carts placed in a shopping cart garage. The customer activates the electronic deposit lock by approaching or placing the mobile telecommunication terminal on a particularly marked area of the loan object, for example on the handle of the shopping cart. This starts the communication of an app running on the telecommunications terminal with an NFC transponder comprised by the deposit lock. Such an NFC has a serial number via which can be used to individualize it. The basis for communication is the NFC Data Exchange Format (NDEF), which can be used to transmit commands to the NFC and read out its status. The NFC of the electronic deposit lock is connected to sensors and/or the motor of the electronic deposit lock via a control unit, in particular in the form of a circuit board. Via this, it can receive status messages or transmit signals sent by the customer's mobile telecommunications device to the control unit of the electronic deposit lock.

At the start of communication between the app and the deposit lock, the NDEF tag is read out. This NDEF tag can contain several customer-related elements such as URL tags, text tags, etc. One of these elements is a text tag as a command tag, comprising several variables, for example with the variables "SXYZ". In the example, the "S" stands for status, X="1" for the closed electronic deposit lock, Y="1" if there is a bonus, and Z="1" if the electronic deposit lock is ready. If the electronic deposit lock is open, X takes a different value, for example "0", the same applies to Y if no bonus is present. If the deposit lock is not ready, the value of Z may vary, depending on the errors detected by the deposit lock. For example, a certain value may signal an energy storage device that is running low, while another value may signal an outside temperature that is too low or too high for proper operation. If the command tag does not contain a status message but an instruction, this tag includes a different value, for example C, instead of S.

To open the electronic deposit lock, the command tag should be checked during readout to see if there is an X and Z value indicating that the deposit lock is both operational (Z="1") and closed (X="1"). Then, to open the deposit lock, the app can transmit a command tag to the electronic deposit lock that includes an opening signal.

For the bonus issue, it is advantageous in this case if the loan object, preferably only when it is returned after being used for a certain unit of time, in particular of at least one, preferably of at least 5 minutes, for example until the shopping cart is coupled again, for a certain unit of time, for example 30 seconds, there is a content in the command tag when it is read out, which comprises the X value for closed and the Y value for bonus present. Now, to retrieve the bonus, a command tag can be transmitted to the electronic deposit lock, which keeps the deposit lock closed and releases the bonus by resetting the Y value. In the given example, such a command tag could thus include the content "C011".

Due to the possibility of storing customer-related content in the NFC, an app installed on the mobile telecommunication device can distinguish between different markets or retail chains, for example, based on this information.

If the deposit system has the features described at the beginning, it can also be unlocked manually by inserting a deposit. In this case, however, the customer cannot retrieve a bonus afterwards.

Furthermore, data on frequency of use, power consumption, voltage history, etc. can be stored in the NFC. This makes it possible to determine the current operating time of an electronic deposit lock and the expected remaining operating time using a service app.

The NDEF tag of the electronic deposit lock is preferably in the cleared state when it is delivered. When accessed with the customer app, a formatting command tag is transferred. Now the electronic deposit lock is formatted with this tag, an overwriting with other content or deleting is no longer possible for the customer.

From the app's point of view, there are thus three situations, 1. an electronic deposit lock with an empty tag, 2. an electronic deposit lock with a customer tag and a command tag, or 3. an electronic deposit lock with a customer tag and a command tag from another customer, e.g. from another store.

The app's response differs depending on the detected situation: in the first situation, the customer tag and the command tag are transmitted for formatting. In the second situation, the customer tag and, for example, the command tag containing the content "C101" for opening the electronic deposit lock are transmitted. In the third situation, no action is performed.

A method for operating the electronic deposit lock thus preferably comprises the following steps. Starting from an electronic deposit lock, which is preferably in energy-saving standby in the closed state, a customer wishing to use the loan object places his mobile telecommunications terminal on the electronic deposit lock. The NFC tag of the electronic deposit lock stores the serial number of the NFC transponder, the customer-specific tag and the status of the electronic deposit lock. The app loaded on the customer's mobile telecommunications terminal communicates with the NFC tag by reading the NFC tag and thereby learning the serial number, the customer-specific tag and the status of the electronic deposit lock.

In the given example, the status of the electronic deposit lock indicates that the electronic deposit lock does not contain an error message, the shopping cart is coupled by means of the electronic deposit lock, and preferably that no bonus is to be issued.

This fulfills the conditions that the shopping cart can be uncoupled. To this end, the app communicates with the NFC tag and transmits the signal for opening the electronic deposit lock of the shopping cart.

The control unit, in particular comprising an MCU, wakes up from standby by the communication and checks the transmit signal. If it receives the transmitted signal open, the motor is actuated to unlock the lock.

When the shopping cart is returned, the customer slides a free key of the deposit lock system into the electronic deposit lock to couple the shopping cart again.

By pressing the key when inserting it into the deposit lock, the shopping cart is coupled and this action is signaled to the system via a Hall sensor and the corresponding value is written to the command tag. Now a timer of e.g. 30 seconds is started. If the bonus is not called up by the time the timer expires, the value is deleted again.

The status is read out via the customer's mobile telecommunications terminal. If the customer reads out the command tag within the time specified by the timer, the control unit wakes up from standby through communication and checks the transmit signal. The app receives the serial number, the customer-specific tag and the status message of the electronic deposit lock. If the signal is sent, the bonus is reset. This is done by resetting the value of the bonus in the status of the NFC tag.

The invention claimed is:

1. A method of operating a deposit lock system for a loan object, wherein a blocking element of a deposit lock in a holding position secures a key in the deposit lock against removal and in a release position releases the key; and wherein a locking element in a locking position blocks a displacement of the blocking element from the holding position into the release position and in an unlocking position releases the displacement of the blocking element into the release position;

the method which comprises:

inserting a deposit token into the deposit lock to cause an actuator to move from a first position to a second position, wherein the actuator, upon moving from the first position to the second position, displaces the locking element from the locking position to the unlocking position, and wherein a return of the locking element to the locking position and a return of the actuator to the first position is blocked by the blocking element when the blocking element is in the release position;

effecting a release of the key from the deposit lock by causing an electric drive to drive a carriage which is displaceably mounted on the blocking element in an initial position, wherein in a first movement step of the carriage the carriage moves the locking element from the locking position into the unlocking position and in a second movement step of the carriage the carriage moves back into the initial position;

placing a spring element under tension during at least one of the first or second movement step, and moving the locking element into the locking position by relaxing the spring element as soon as the blocking element releases the return of the locking element into the locking position.

2. The method according to claim 1, which comprises operating the deposit lock system of a manually movable transport trolley.

3. The method according to claim 1, which comprises controlling the electric actuator by a sensor that is configured to detect a wirelessly transmitted signal which triggers the movement of the electric drive.

4. The method according to claim 3, which comprises detecting with the sensor a reaching of the unlocking position of the locking element.

5. The method according to claim 3, which comprises detecting with the sensor a reaching of the initial position of the carriage and/or a reaching of the end position of the first movement step of the carriage.

6. The method according to claim 1, wherein the blocking element in the release position prevents the actuator from returning to the first position.

7. The method according to claim 1, wherein the deposit lock includes a control unit and the method comprises receiving status messages of the deposit lock with the control unit and transmitting the status messages to an NFC tag of the deposit lock.

8. A deposit lock system for a loan object, the deposit lock system comprising:

a deposit token, a deposit lock, and a key, wherein the key is released from the deposit lock when the deposit token is inserted into the deposit lock;

a blocking element adjustably mounted in the deposit lock for movement between a holding position, in which the blocking element secures the key in the deposit lock against removal and a release position, in which the blocking element releases the key;

a locking element adjustably mounted between a locking position, in which the locking element holds the blocking element in the holding position and an unlocking position, in which the locking element releases the blocking element;

the deposit lock having at least one actuator mounted for movement from a first position to a second position by an insertion of the deposit token into the deposit lock, the actuator having a contact surface for the locking element, so that a movement of the actuator from the first position to the second position causes a displacement of the locking element from the locking position to the unlocking position, wherein the blocking element in the release position blocks a path of the locking element into the locking position and a path of the actuator into the initial position;

a carriage movably mounted on said locking element and an electric drive connected to the carriage for driving the carriage; and a spring element arranged on said locking element and disposed to be under tension when the blocking element blocks the path of the locking element back into the locking position.

9. The deposit lock system according to claim 8 configured to carry out the method according to claim 1.

10. The deposit lock system according to claim 8, wherein the blocking element is a pin.

11. The deposit lock system according to claim 8, wherein the spring element is a coil spring.

12. The deposit lock system according to claim 8, wherein the electric drive is an electric motor.

13. The deposit lock system according to claim 12, wherein the electric motor is a rotary motor and an eccentric is arranged between the electric motor and the carriage, the eccentric being configured to convert a rotary movement of the electric motor into a linear movement of the carriage.

14. The deposit lock system according to claim 12, wherein the electric motor is a linear motor.

15. The deposit lock system according to claim 8, further comprising a control unit being an MCU.

16. The deposit lock system according to claim 8, wherein said spring element is formed with a first end region that fits against the carriage and a second end region that fits against the locking element.

17. The deposit lock system according to claim 8, wherein spring element is formed with a first end region that fits against the locking element and a second end region that fits against a stop arranged stationary to the electric drive.

* * * * *